United States Patent Office 3,574,641
Patented Apr. 13, 1971

3,574,641
HIGH NEUTRALIZED PROPYLENE GLYCOL ALGINATE IN FRENCH DRESSING
John J. O'Connell, San Diego, and Darrell A. Betz, Placentia, Calif., assignors to Kelco Company, San Diego, Calif.
No Drawing. Filed Mar. 29, 1968, Ser. No. 717,445
Int. Cl. A23l 1/24
U.S. Cl. 99—144         2 Claims

ABSTRACT OF THE DISCLOSURE

A French dressing containing a propylene glycol alginate having the following characteristics:

Calcium content as CaO—less than about 0.7% by weight
Viscosity in 2% aqueous solution—100 to 2000 c.p.s.
Neutralization as sodium alginate—45 to 55%
Esterification—35–45%
Unreacted acidity—the balance and not less than about 3%
pH in 2% aqueous solution—4.0 to 5.0.

---

This invention relates to an improved French dressing which contains a new form of highly neutralized propylene glycol alginate. Also, the invention pertains to a method for forming an improved French dressing by incorporating therein a new form of highly neutralized propylene glycol alginate.

The general use of propylene glycol alginate in preparing oil-in-water emulsions is not new and is disclosed in U.S. Pat. 2,455,820 to Steiner. Moreover, the preparation of partially neutralized alkylene glycol alginates is not new and is disclosed in U.S. Pat. 2,494,911 to Steiner and McNeely. As described in the above patents, propylene glycol alginates are known materials which may be employed in a variety of food products. Example 2 of U.S. Pat. 2,455,820 discloses the use of a low viscosity alginate having a viscosity between 1,500 and 1,000 centipoises in 2% aqueous solution in forming a French dressing.

The use of propylene glycol alginates, in general, has met with considerable success and they have been employed in a variety of food products. The present invention pertains to the use of a new form of propylene glycol alginate in French dressings which results in a product having improved body in that the dressing has a uniform finely homogenized, rich, creamy consistency. Moreover, the product has improved pourability at both room temperatures and under refrigeration.

The propylene glycol alginate which we employ is one having the following characteristics:

Calcium content as CaO—less than about 0.7% by weight;
Viscosity in 2% aqueous solution—100 to 200 c.p.s., preferably 120–180 c.p.s.;
Neutralization as sodium alginate—45 to 55%;
Esterification—35–45%;
Unreacted acidity—the balance and not less than about 3%, and
pH in 2% aqueous solution—4.0 to 5.0.

In use, the new form of propylene glycol alginate which we employ, as defined above, is present in the French dressing in an amount of about 0.25 to 0.75% by weight.

French dressing is a standard food commodity whose ingredients and the permissible amounts thereof are controlled by Federal regulations. As described in the Federal regulations, a French dressing may include an emulsified edible vegetable oil containing as acidifying ingredients vinegar, or vinegar diluted with water and containing citric acid as an optional ingredient in specified amounts. Other permissible acidifying ingredients are lemon juce, lime juice, or mixtures thereof. Seasoning ingredients can include salt, sugar, dextrose, corn syrup, invert sugar syrup, nondiastatic maltose syrup, glucose syrup, or honey with the foregoing sweetening ingredients employed in either syrup or dried form. In addition, French dressing can contain mustard, paprika, other spices, spice oils or spice extracts, monosodium glutamate, tomato paste, tomato puree. ketchup, sherry wine, or any other suitable harmless food seasoning or flavoring other than imitations. Also there may be included various emulsifying ingredients in an amount not more than 0.75 percent by weight of the finished French dressing. In illustrating a French dressing of our invention, the following dressing was prepared which contained the following ingredients in parts by weight:

|  | Parts |
|---|---|
| A highly neutralized propylene glycol alginate as previously defined | 0.5 |
| Cider vinegar | 5.50 |
| Vinegar, 100 grain | 8.35 |
| Water | 32.35 |
| Sugar | 5.50 |
| Salt | 2.00 |
| Tomato puree | 9.00 |
| Paprika | 1.50 |
| Mustard | 0.30 |
| Vegetable oil | 35.00 |

In forming a French dressing containing the above ingredients, the water is placed in a mixing tank together with the tomato puree, or a tomato juice. The high neutralized propylene glycol alginate is then dry blended with the dry spices, with the exception of salt, and is added to the liquid in the mixing tank with vigorous agitation. The agitation is continued for approximately 2 minutes for a 25 gallon batch and for a 100 gallon batch the agitation is continued for about 8 minutes. Following this, the vinegar, sugar, salt and liquid spices, if any are employed, are added, and the agitation is continued for an additional 2–4 minutes until these ingredients are dissolved. Following this, the vegetable oil is added with the addition being slow at first and then at a faster rate with continued agitation until the oil is completely dispersed throughout the emulsion. Following this, the emulsion is put through a homogenizer or a colloid mill and then to a filling machine where it is placed in bottles.

A typical French dressing prepared according to the above example was found to have a finely homogenized, rich, creamy body and improved pourability at both room temperature and under refrigeration, as compared with French dressings of the prior art.

A high neutralized propylene glycol alginate as required for use according to our invention, is formed by admixing alginic acid having a low calcium content with a sodium source, such as sodium bicarbonate or sodium carbonate until about 45–55 mole percent of the carboxyl groups have reacted to form the sodium salt. Following this, the material is placed in a reactor and esterified with propylene glycol to a pH slightly in excess of 4 in water solution. Following this, the material is discharged from the reactor after which it is dried, milled and packaged. The process required for forming high neutralized propylene glycol alginate employed in our invention does not differ appreciably from the process described in the above cited Steiner and McNeely patent U.S. 2,494,911, which is incorporated herein by references.

As used throughout the specification and in the claims, the term "French dressing" is intended to refer to an In the foregoing specification, we have made reference to a specific French dressing formulation for purposes of illustration. However, we do not desire that our invention be limited except as defined by the following claims when interpreted according to the spirit of our invention.

We claim:

1. An emulsified French dressing containing about 0.25 to 0.75 percent by weight of a high neutralized propylene glycol alginate having the following characteristics:

Calcium content as CaO—less than about 0.7% by weight;
Viscosity in 2% aqueous solution—100 to 200 centipoises;
Neutralization as sodium alginate—45 to 55%;
Esterification—35 to 45%;
Unreacted acidity—the balance of the carboxyl groups and not less than about 3%; and
pH in aqueous solution—4.0 to 5.0.

2. The emulsified French dressing of claim 1, wherein said high neutralized propylene glycol alginate has a viscosity in 2% aqueous solution of 120 to 180 centipoises.

References Cited

UNITED STATES PATENTS 2,494,911   1/1950   Steiner et al. _____ 260—209.6

OTHER REFERENCES

Steiner et al.: Organic Derivatives of Alginic Acid, Industrial and Engineering Chemistry, vol. 43, 1951, pp. 2073–2077.

RAYMOND N. JONES, Primary Examiner

J. M. HUNTER, Assistant Examiner

U.S. Cl. X.R.

260—209.6

UNITED STATES PATENT OFFICE
CERTIFICATE OF CORRECTION

Patent No. 3,574,641      Dated April 13, 1971

Inventor(s) John J. O'Connell et al.

It is certified that error appears in the above-identified patent and that said Letters Patent are hereby corrected as shown below:

Column 1, line 16, "2,000 c.p.s." should read -- 200 c.p.s. --.

Signed and sealed this 21st day of September 1971.

(SEAL)
Attest:

EDWARD M. FLETCHER, JR.
Attesting Officer

ROBERT GOTTSCHALK
Acting Commissioner of Pat